United States Patent [19]

Tazaki

[11] Patent Number: 4,517,578

[45] Date of Patent: May 14, 1985

[54] ELECTRONIC APPARATUS WITH PRINTER

[75] Inventor: Shigemitsu Tazaki, Matsudo, Japan

[73] Assignee: Canon Kabushiki Kaisha, Tokyo, Japan

[21] Appl. No.: 553,816

[22] Filed: Nov. 21, 1983

[30] Foreign Application Priority Data

Dec. 1, 1982 [JP] Japan .................. 57-210905

[51] Int. Cl.³ .......................................... G01D 15/18
[52] U.S. Cl. .................................. 346/140 R; 346/65;
346/136; 400/126; 364/518
[58] Field of Search ................ 346/140 R, 136, 65,
346/66; 400/126; 364/518; 340/722

[56] References Cited

U.S. PATENT DOCUMENTS 4,415,911 11/1983 Tazaki ........................... 346/140 R
4,479,134 10/1984 Kawanabe ..................... 346/140 R Primary Examiner—Joseph W. Hartary
Attorney, Agent, or Firm—Fitzpatrick, Cella, Harper & Scinto

[57] ABSTRACT

An electronic apparatus includes a printer for graph printing, in which the vertical and horizontal dimensions of the printed graph can be modified by a device for modifying the scales of the graph.

3 Claims, 18 Drawing Figures

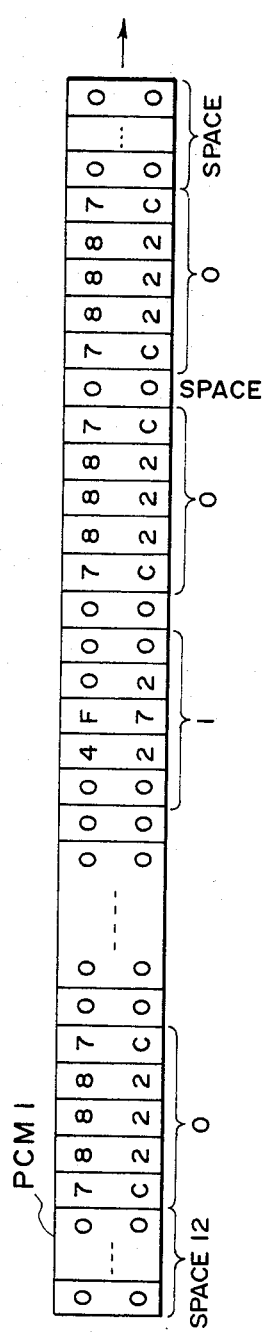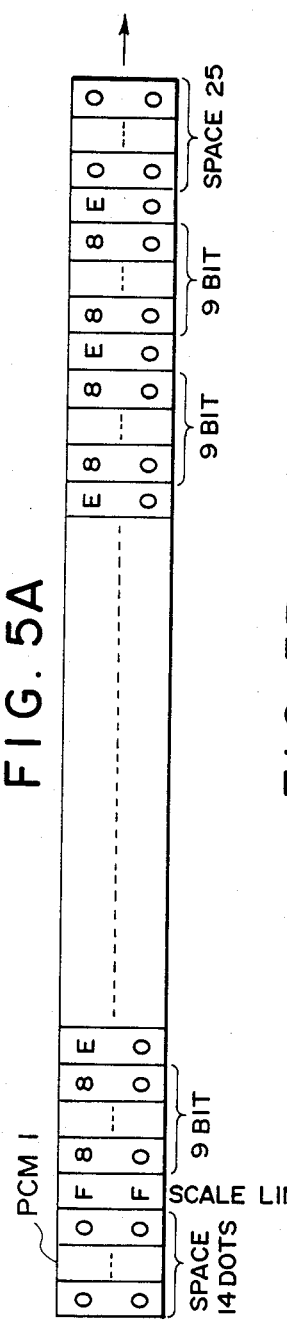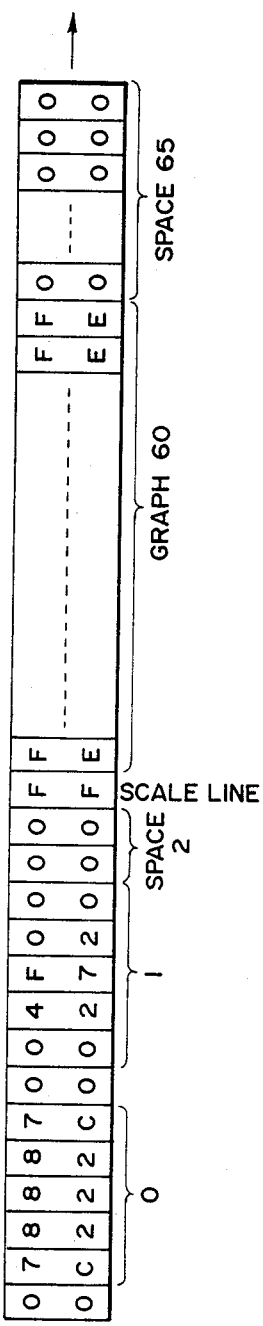

ns in the
ELECTRONIC APPARATUS WITH PRINTER

BACKGROUND OF THE INVENTION

1. Field of the Invention

The present invention relates to graph printing in an electronic apparatus such as a calculator equipped with a printer.

2. Description of the Prior Art

Graphic displays of the results of calculations in the form of a chart or a graph are already well known for achieving easier visual understanding.

Also the ability to print such graphs is already available in certain apparatus.

However, in the conventional apparatus with such graph printing function, the size of the obtained graph is often too large or too small for the user, and may not, in certain cases, be accommodated on a sheet of determined size and thus has to be printed on plural sheets.

Also certain graphs containing a large number of data may appear excessively long for the user. Furthermore it is often desirable for the user to expand the graph for larger legibility or to reduce it for inserting other comments.

SUMMARY OF THE INVENTION

The object of the present invention is to avoid the above-mentioned drawbacks and to enlarge or reduce the size of the graph, according to the selection of switches or keys for instructing size enlargement or reduction, in the horizontal direction by the feed control of a rolled sheet and/or in the vertical direction by a change in size of the graph itself. Another object of the present invention is to enable printing of comments or the like when the size of the graph is modified in the vertical direction.

BRIEF DESCRIPTION OF THE DRAWINGS

FIGS. 5(A), (B) and (C) are schematic charts showing memory maps;

DETAILED DESCRIPTION OF THE PREFERRED EMBODIMENTS

Now the present invention will be clarified in detail by the following description which is to be taken in conjunction with the attached drawings.

Figure 1:
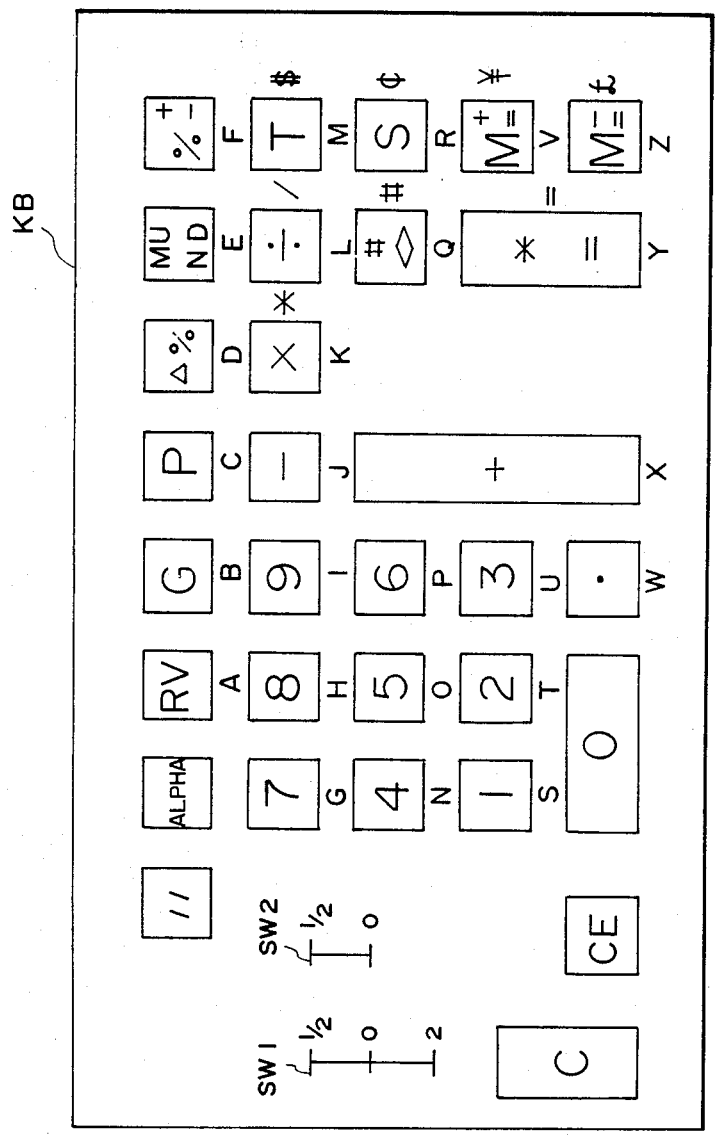
FIG. 1 is a plan view of an example of a keyboard for use in the present invention.

FIG. 1 shows a keyboard KB of an electronic calculator with a printer for a rolled sheet, constituting an embodiment of the present invention.

Figure 2A:
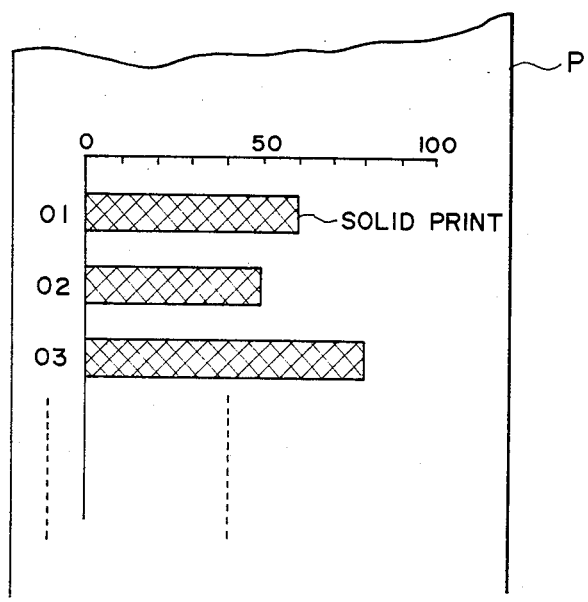
FIGS. 2 (A), (B) and (C) are schematic views showing examples of printings obtained according to the present invention.
Figure 2B:
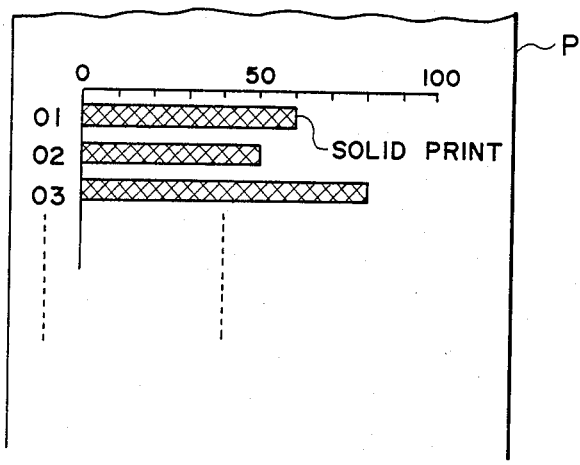
Figure 2C:
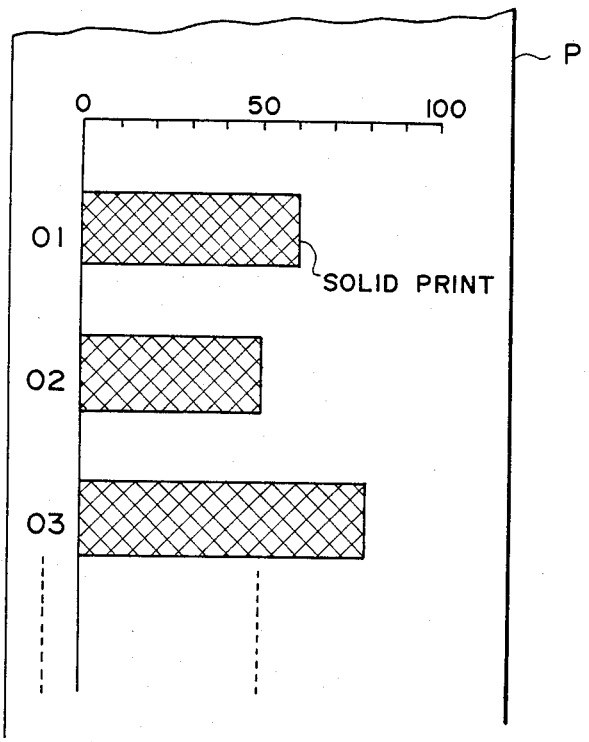

At first there will be explained a function of enlarging or reducing the size of the graph in lateral direction by the feed control of the rolled sheet. FIG. 2 shows an example of the printing on said rolled sheet P. In the ordinary graph printing, a graph key "G" on the keyboard KB is actuated to select a graph mode, and lateral direction switch SW1 and a vertical direction switch SW2, constituting a print mode switch group, are respectively positioned at "0" and "0" whereby a print shown in FIG. 2(A) is obtained. Also prints shown in FIG. 2(B) or FIG. 2(C) can be obtained by positioning the switch SW1 alone respectively at "½" or "2".

Figure 3:
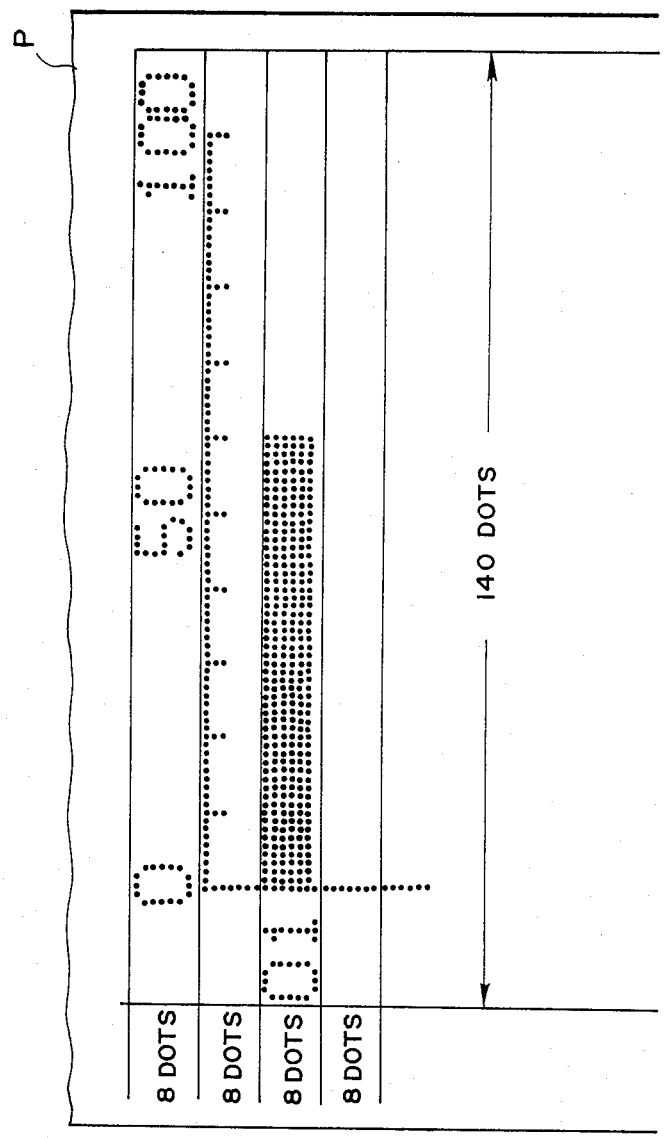
FIGS. 3 and 4 are schematic views showing the principle of printing.
Figure 4:
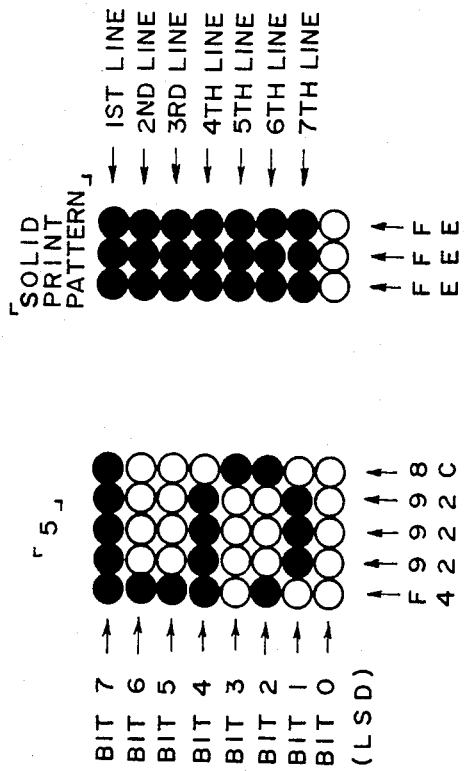

In such state function keys shown in FIG. 1 are rendered usable for data entry for the graph printing. The graph is composed of a planar array of dots, in which the printing of a line provides 140 dots in the lateral direction and 8 dots in the vertical direction as shown in FIGS. 3 and 4. A print memory PCM1 shown in FIG. 5 has a capacity of 140 bytes, wherein a byte corresponds to $1 \times 8$ dots.

Figure 6:
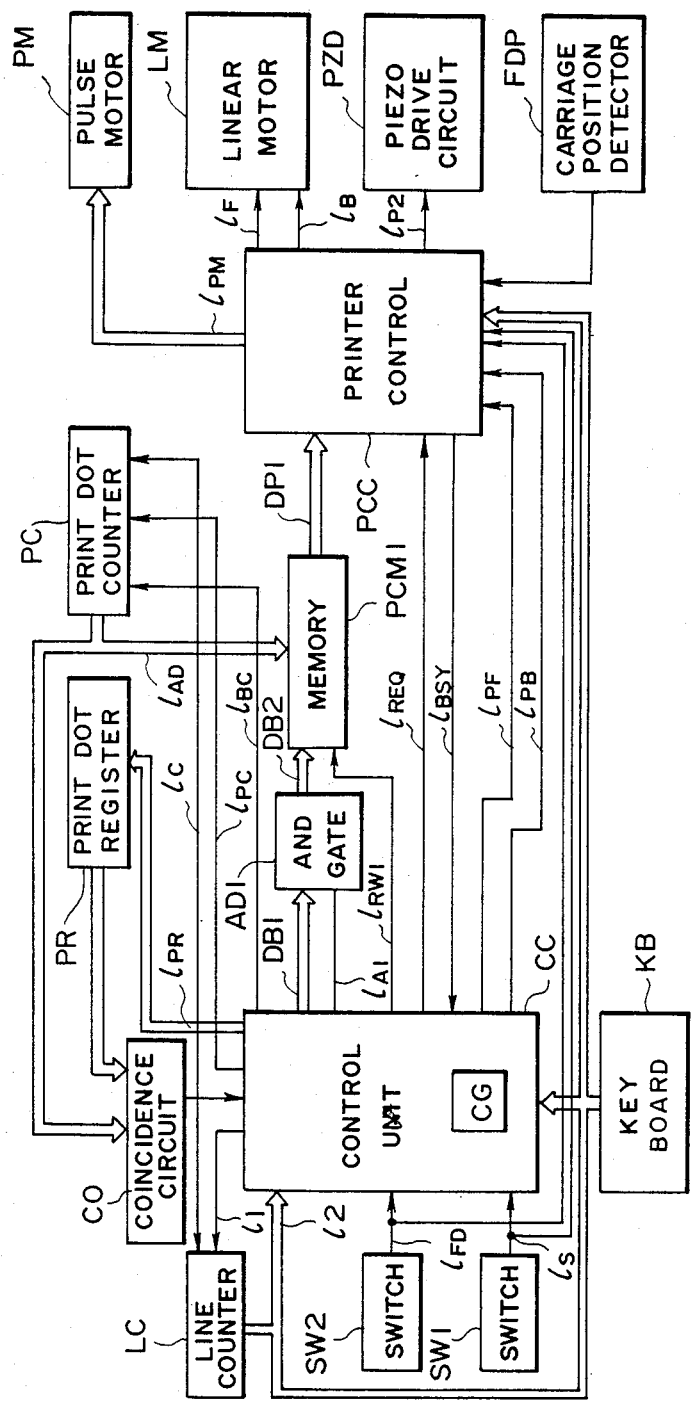
FIG. 6 is a block diagram showing an embodiment of a control unit.
Figure 7:
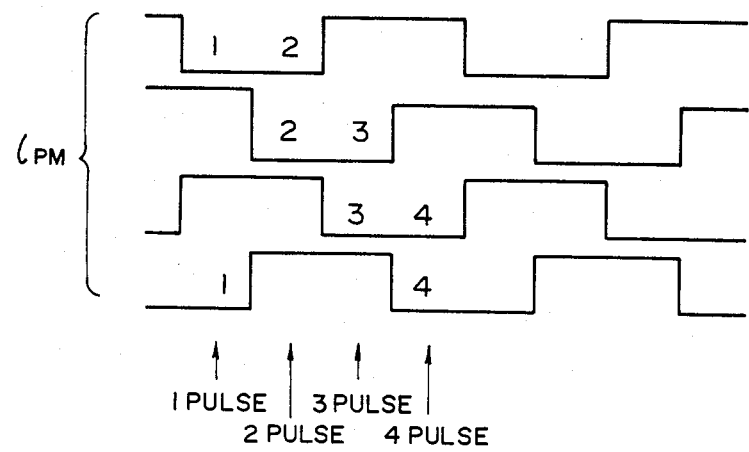
FIG. 7 is a waveform chart showing the paper feeding operation.

In case of printing a graph representing a target value and an actual value for a maximum scale of 100, a number "100" is entered from the keyboard KB followed by the actuation of a function key, for example "$\pm$", representing that said number is a scale number, whereby a control unit CC shown in FIG. 6 recognizes the instruction for the printing of scale numbers and stores dot patterns representing said entered number "100", a half number "50" and zero "0", together with a dot pattern representing space, in the memory PCM1. This operation is conducted in the following manner. At first a number "139" is set in a print dot register PR through a signal line $1_{PR}$, and a print dot counter PC and a line counter LC are cleared through a signal line $1_C$. The output signal $1_{AD}$ of said dot counter PC is used as an address signal for the print memory PCM1. Then a signal line $1_{A1}$ is shifted to a level "1" to open an AND gate AD1 thereby transmitting the print data from a data signal line DB1 to a signal line DB2, and said print data are stored in the memory PCM1 by shifting a read-write signal line $1_{RW1}$ to a level "0". Then a coincidence circuit CO compares the content of the print dot register PR and of the print dot counter PC, and, in the absence of coincidence, the content of the dot counter PC is increased by one through a signal line $1_{PC}$ followed by the storage of succeeding print data of 8 dots or 1 byte. This procedure is repeated until the content of the counter PC becomes equal to that of the register PR, thus storing the graph data of 140 bytes in the memory PCM1.

Said data stored in the print memory PCM1 are $1 \times 8$ dots (1 byte) data representing a dot pattern obtained by conversion in a character generator CG in the control unit CC. More specifically, as shown in FIG. 4, a pattern of $1 \times 8$ dots is represented by a hexadecimal number in which the lowermost dot corresponds to the least significant bit. Thus a numeral "5" shown in FIG. 3 is represented, from right to left, by hexadecimal numbers 8C, 92, 92, and F4, while a blackout pattern in FIG. 3 is represented in a similar manner by FE, FE and FE.

In the above-mentioned case of printing scale numbers "100", "50" and "0", the memory PCM1 has a content as shown in FIG. 5, which may be supplied to a printer control unit PCC for driving the printer. In FIG. 6, the printer is equipped with a stepping motor PM for paper feeding and an on-demand type ink jet head mounted on an unrepresented carriage reciprocated by a linear motor LM. The printing is achieved by driving a piezo driving circuit PZD by timing pulses detected by a carriage position detector FDP. Upon completion of the storage of the print data in the print memory PCM1 in the aforementioned manner, the control unit CC shifts the signal line $1_C$ to "0" to clear the print dot counter PC and the line counter LC and to return the address of the print memory PCM1 to the initial value. Then the read-write signal line $1_{RW1}$ is shifted to "1" to select the reading mode, and, after confirmation of the non-busy state of the printer control unit PCC represented by the level "1" of a signal line $1_{BSY}$, signal lines $1_{PF}$ and $1_{PB}$ are respectively shifted to "1" and "0", thus instructing the printer control unit PCC to effect the printing operation. In response to said instruction the printer control unit PCC enters the busy state and shifts driving signal lines $1_F$ and $1_B$ for the linear motor LM respectively to "1" and "0", thus causing a forward motion (toward left on the printing paper) of the carriage from a home position at the right-hand side of said printing paper. During said motion the carriage position detector FDP generates timing pulses, and, in response to a timing pulse immediately preceding the print start position the signal line $1_{BSY}$ is shifted to a level "1", thus indicating to the control unit CC that the print data are receivable. In response thereto, the control unit CC shifts a signal line $1_{REQ}$ to "0" indicating that the data on the data line DP1 are effective, whereupon the printer control unit PCC shifts the line $1_{BSY}$ again to "0" representing the busy state. Then the printer control unit PCC reads the data from the print memory PCM1 and, in response to a succeeding timing pulse, drives the piezo drive circuit PZD through a signal line $1_{PZ}$ for effecting a print of the uppermost bit of the $1 \times 8$ dot pattern by an output line $1_2$ of the line counter LC.

Upon completion of said printing, the line $1_{BSY}$ is shifted to "1" in order to indicate the control unit CC that the succeeding print data are receivable. Thus the control unit CC increases the address in the print dot counter PC by one through the signal line $1_{PC}$, releases the succeeding data to the line DP1, and shift the signal line $1_{REQ}$ to "0" for indicating that said data on the data line DP1 are effective, as explained above. In response the printer control unit PCC reads the data from the print memory PCM1 and effects the printing at the succeeding timing pulse. In this manner the uppermost dots of the $1 \times 8$ dot patterns shown in FIG. 5(A) are printed in a direction indicated by an arrow, by means of a signal nozzle. During the above-described printing operation, the coincidence circuit CO compares the content of the print dot register PR with that of the print dot counter PC stepwise increased at each dot printing, and, in case of coincidence, the control unit CC identifies the completion of printing of 140 dots, clears the print dot register PR by a signal $1_{PR}$, increases the content is the line counter LC by one, and shifts the signal lines $1_{PF}$ and $1_{PB}$ respectively to "0" and "1".

In response the printer control unit PCC shifts the busy signal line $1_{BSY}$ to "0", and shifts the signal lines $1_F$ and $1_B$ respectively to "0" and "1", thus driving the carriage in the reverse direction (to right on the printing paper) for printing the second dots from the top in the $1 \times 8$ dot pattern according to the content of the line counter LC. At the same time the stepping motor PM is activated to advance the paper by a dot pitch.

Said stepping motor PM is of 4-phase type, so that the paper feeding of a dot pitch is achieved by 4 pulses. In the normal print mode in which the print mode switches SW1 and SW2 are respectively at "0", 4 pulses are supplied to feed the paper by a dot pitch. Then, in the same manner as in the printing in the forward direction, the busy signal line $1_{BSY}$ is shifted to "1" at a timing pulse immediately preceding the print start position, thus indicating to the control unit CC that the print data are receivable, whereby the control unit CC shifts the line $1_{REQ}$ to "0" to indicate the effectiveness of a signal of the 140th dot, or the first dot in the backward printing. In response the printer control unit PCC receives the print data, effects the printing operation at the next timing pulse, and shifts the busy signal line $1_{BSY}$ to indicate that the succeeding print data are receivable in the same manner as explained before. In response the control unit CC stepwise decreases the content of the print dot counter PC through a signal line $1_{BC}$ for the backward printing to release a signal for the 139 dot to the data line PD1, and shifts the line $1_{REQ}$ to "0" for effecting the printing opration at a succeeding timing pulse.

In the same manner the second dots from the top in the $1 \times 8$ dot patterns are printed in the backward direction up to the first dot data. When the coincidence circuit CO identifies the presence of coincidence in the aforementioned manner, the control unit CC steps up the content of the line counter LC through a signal line $1_1$. An output line $1_2$ of the line counter LC is used for detecting the completion of four cycles of the carriage motion, and for instructing the number of line in the $1 \times 8$ dot print data. In the above-explained state the printing operation continues since only one cycle has been completed. As explained bofore, the control unit CC changes the content of the print dot register PR to "140", and shifts the signal lines $1_{PF}$ and $1_{PB}$ respectively to "1" and "0" for instructing the printing of the third dots from the top in the $1 \times 8$ dot patterns by the line counter LC. In response the printer control unit PCC shifts the busy signal line $1_{BSY}$ to "0" for feeding the paper by a dot pitch through the stepping motor PM, and shifts the signal lines $1_F$ AND $1_B$ for the linear motor LM respectively to "1" and "0" for effecting the printing operation in the forward direction.

Printing operation in the backward direction is conducted when the coincidence circuit CO detects coincidence as explained before. The above-described procedure is repeated until the printing operation of 4 cycles is completed. Upon completion thereof, the control unit CC steps up the line counter LC, and identifies the completion of printing of $1 \times 8$ dot patterns in a lateral length of 140 dots by a value "8" of the output signal line $1_2$ of said counter.

Upon completion of the printing of a line in the above-described manner, and recognizing that said printing is for the scale numbers, the control unit CC stores the data of the scale line in the print memory PCM1 as shown in FIG. 5(B). Then the printing of the scale line is completed according to the content of the print memory PCM1 shown in FIG. 5(B) by means of 4 cycles of carriage motion in the same manner as in the printing of the scale numbers. The printing operation in response to the key entry "100 ≐ is completed in this manner.

Then, in response to key entries "60+" as an actual value, the control unit CC recognizes a graph printing and calculates a position on the graph with reference to the initially entered target value 100. As shown in FIG. 3, the target value 100 corresponds to the 26th dot from the right in the entire 140 dots on the printing paper P, while the actual value 60 corresponds to 63 dots after a space of 65 dots. Corresponding to such graph pattern, a black-out pattern for the graph of 60 dots is stored in the print memory PCM1 together with 1 dot for the scale printing, 2 dots for a space and a count number "01", as shown in FIG. 5(C).

Upon storage of the above-described graph printing data in the print memory PCM1, the control unit CC performs the printing operation in 4 cycles of the carriage as explained beofre. In a similar manner the printings for the items 02 and 03 shown in FIG. 2(A) are achieved in response to the key entries of "50+" and "80+".

In the foregoing there has been explained an ordinary graph printing. In case of printing said graph in a reduced size, the operator sets the print mode switch SW1 at "½" prior to the key entry operation explained above, whereby the printer control unit PCC, detecting the state of the print mode switches SW1, SW2 respectively at "½" and "0" through signal lines $1_S$ and $1_{FD}$, effects the paper feeding by two pulses instead of 4 pulses in the ordinary printing mode, thereby reducing the paper feeding pitch to a half and reducing the print size to a half in the lateral direction of the graph or in the longitudinal direction of the rolled sheet. In this manner a print with a reduced size is obtained as shown in FIG. 2(B).

Also in case of printing said graph in an enlarged size, the print mode switch SW1 is set to "2" prior to the key entry operation in the normal printing mode.

In this case the control unit CC does not effect the stepwise increment of the line counter LC after the printing operation in the forward direction but only after that in the backward direction, or after a cycle of carriage motion, whereby the printer control unit PCC performs the same printing in the backward motion as in the forward motion while the paper is advanced by a dot pitch the same as in the normal printing mode. Consequently there is obtained a graph print extended in the lateral direction twice as far, as shown in FIG. 2(C).

In the foregoing description the graph printing is expanded or reduced in size in the lateral direction of the graph, or, in the longitudinal direction of the rolled sheet, by means of manipulation of the lateral direction switch SW1, by a factor of 2 or ½ in comparison with the normal graph printing. Now there will be explained an operation of modifying the dimension of the graph in the vertical direction of the graph, or, transverse to the direction of the rolled paper.

Figure 8A:
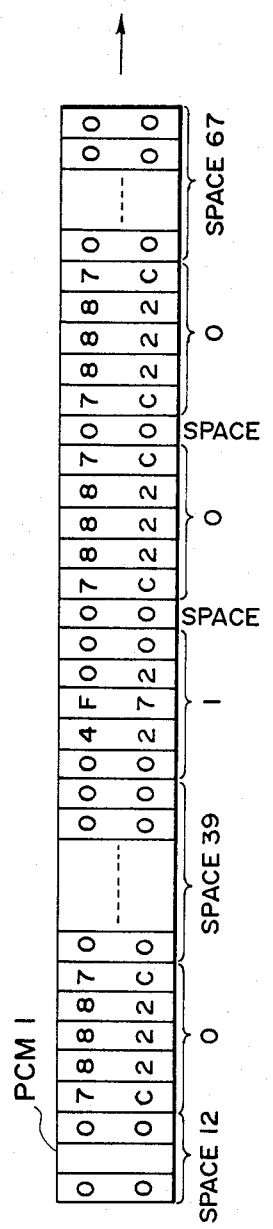
FIGS. 8 (A), (B) and (C) are schematic charts showing other examples of memory maps.
Figure 8B:
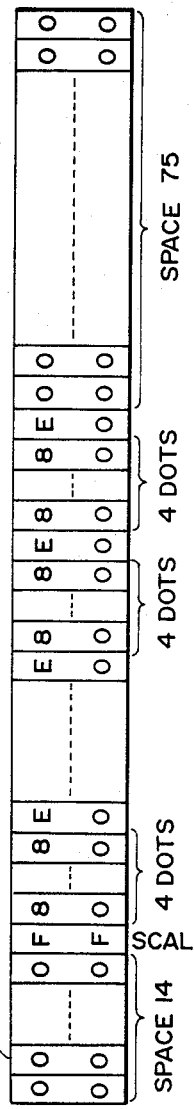

In the aforementioned normal printing, the vertical coordinate is composed on 100 dots at maximum. In order to reduce the dimension of the graph in said direction to half, while maintaining the dimension in the lateral direction as in the normal printing mode, the lateral direction switch SW1 is positioned at "0" and the vertical direction switch SW2 is positioned at "½", and key entry operation are conducted in the same manner as in the normal graph printing. The control unit CC and the printer control unit PCC detect the above-mentioned status of the switches SW1, SW2 through the signal lines $1_S$ and $1_{FD}$, so that the entered scale number "100", indicating the target value, is printed at a position corresponding to 50th dot instead of 100 dots in the normal printing. The number "0" is printed at the same time. More specifically, within the entire span of 140 dots on the printing paper P, 67 dots from the right-hand end are maintained as blank, then the scale number "100" is printed from the 68th dot position, again a blank is made from the 85th dot to the 123rd dot position, and the number "0" is printed from the 124th dot position. Also the scale line is printed from the 76th dot position to the 126th dot position while 75 dots at the right-hand end are maintained as blank. FIGS. 8(A) and (B) shows the corresponding print data stored in the memory PCM1. The procedure of data storage and printing operation is same as explained before. Then in response to the entry of "60+≐" indicating the actual value, the control unit CC identifies the graph printing and calculates the graph position in reference to the position of the target value initially entered. As the switch SW2 is positioned at "½", the target value "100" is positioned on the printing paper P at the 76th dot from the right-hand end as explained above. Therefore the actual value "60" corresponds to the 96th dot position from the right-hand end, from which is printed a blackout pattern over a span of 30 dots, followed by a scale line print of 1 dot, a space of 2 dots and a print of a figure "01". These prints have a dimension reduced by half in comparison with the case of normal printing.

Figure 8C:
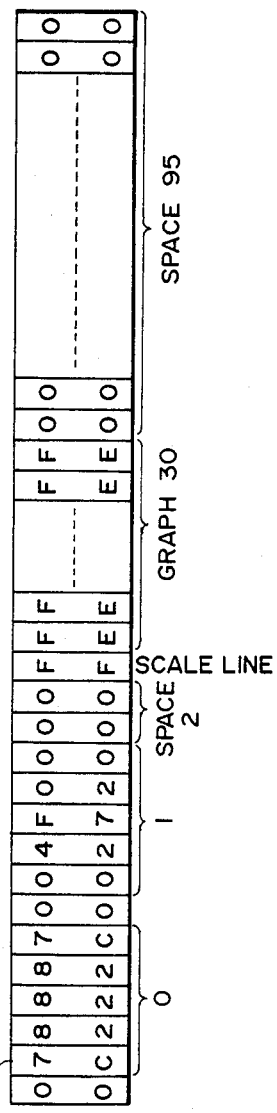
Figure 9A:
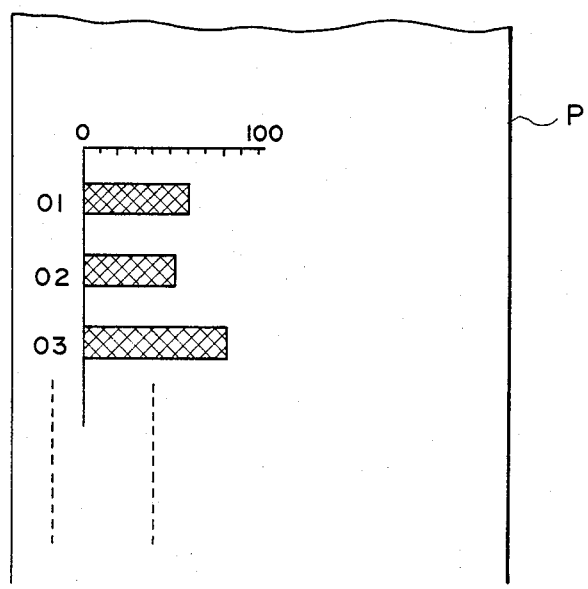
FIGS. 9 (A) and (B) are schematic views showing examples of printings obtained from such memory maps.

FIG. 8(C) shows the corresponding print data stored in the memory PCM1. Subsequently "50+" and "80+" are entered by the keyboard to obtain a print shown in FIG. 9(A) which is reduced to a half in size from the normal print shown in FIG. 2(A).

Figure 9B:
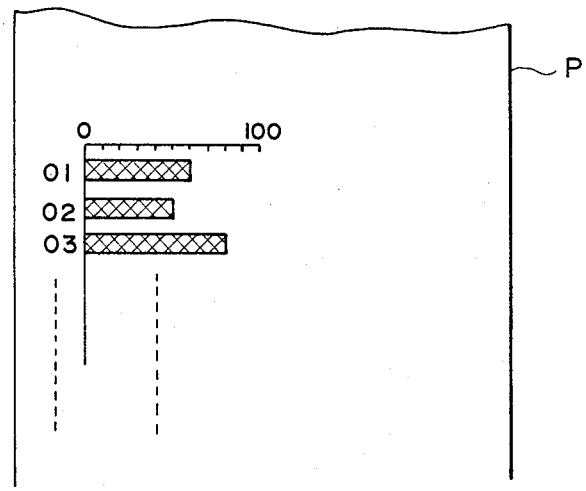

When the print mode switches SW1, SW2 are both positioned at "½", the control unit CC and the printer control unit PCC reduce the graph dimension to a half in the lateral direction (longitudinal direction of the rolled paper) by the paper feed control in addition to the graph dimension reduction in the vertical direction (transverse direction of the rolled paper) explained before, thereby obtaining a print as shown in FIG. 9(B) in response to the data entries as explained before.

The blank area obtained on the sheet in the reduction of graph dimension in the vertical direction (the transverse direction of the rolled sheet) may be utilized for printing comments, for example for specifying the nature of the graph print. Such printing operation of the comment entered simultaneously will be explained in the following.

At first the print mode switches SW1, SW2 shown in FIG. 1 are positioned both at "½", and the keyboard KB is selected for the graph mode by actuating the key "G". Then the target value "100≐" is entered to print the numbers "100" and "0" and the scale line in a size reduced both in the lateral and in the vertical directions. Then, in response to the actuation of a key ["], the control unit CC stores the characters to be entered after said key entry ["] and prior to a next key entry ["], as comment characters for the subsequent graph data entry, into the print memory PCM1. There can be stored 9 characters or 9 numerals in a space of 63 dots at the right-hand end of 140-dot span, in 5×7 dot matrices spaced by 2 dots, wherein an initially entered character or numeral assumes the uppermost digit position. In response to the actuation of the key ["] the function key such as [+] or [−] on the keyboard KB merely represent symbols "+" or "−" instead of executing the corresponding operations, and upon actuation of a key [ALPHA] on the keyboard KB the keys thereon are shifted to represent alphabets A-Z until the next actuation of the key [ALPHA], after which the keyboard awaits the entry of the graph data.

Figure 10:
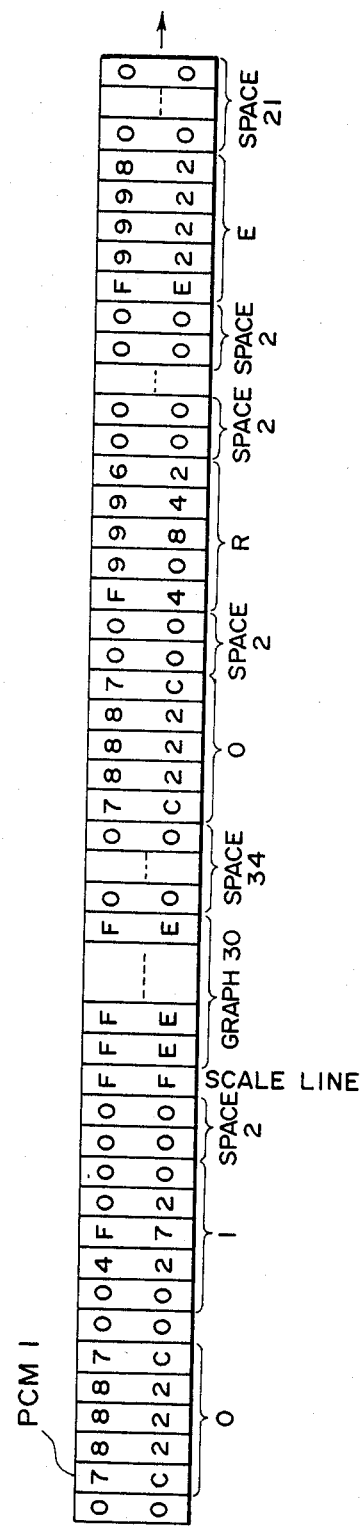
FIG. 10 is a schematic chart showing still another example of memory map.

Thus, in response to the key operations in the order of [ALPHA], [5], [S], [RV], [4], [7], [MU/MD], ["]followed by [6], [0] and [+], there is obtained a comment print "ORANGE" in combination with a graph print of a blackout pattern for span of 30 dots from the 96th dot position, followed by the scale line of a dot, a space of 2 dots and numerals "01", said graph print being reduced both in the lateral direction and in the vertical direction corresponding to the status of the print mode switches SW1, SW2 at "½". FIG. 10 shows the corresponding print data stored in the memory PCM1.

Figure 11:
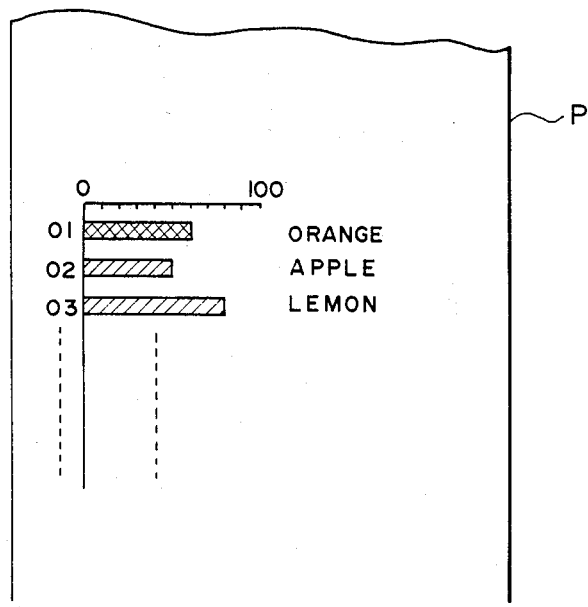
FIG. 11 is a schematic view showing an example of printing obtained from such memory map.

A graph print with comments shown in FIG. 11 can be obtained by subsequent entries of ["], [ALPHA], [RV], [6], [6], [÷], [MU/MD], ["]followed by [5], [0] and [+], and ["], [ALPHA], [÷], [MU/MD], [T], [5], [4], ["] followed by [8], [0] and [+].

In the foregoing explanation the graph dimension is selected by particular switches SW1 and SW2, but there may be provided particular keys for enlargement or reduction of the dimension for obtaining the same effect.

As explained in the foregoing, the present invention allows modification of the dimension of a graph print by means of simple switch operations according to the requirement of the user, thereby avoiding excessively long graph printing, economizing the printing sheet, enabling enlarged graph print for better legibility and adding comments to the graph.

What we claim is:

1. An electronic apparatus with a printer comprising:
   dot printing means for printing a graph on a printing sheet;
   first manual setting means for manually selecting the vertical dimension of said graph;
   second manual setting means for manually selecting the lateral dimension of said graph; and
   control means for graph printing in variable dimensions in the vertical and lateral directions by driving said dot printing means according to the selections provided by said first and second manual setting means.

2. An electronic apparatus with a printer according to claim 1, wherein said control means is adapted to control the vertical and lateral dimensions of characters to be printed according to the selections provided by said first and second manual setting means.

3. An electronic apparatus with a printer according to claim 1, wherein said dot printing means comprises an ink jet nozzle.

* * * * *